(12) United States Patent
Ikezawa

(10) Patent No.: US 9,124,787 B2
(45) Date of Patent: Sep. 1, 2015

(54) ELECTRONIC APPARATUS HAVING MECHANISM TO FASTEN EXTERIOR MEMBERS TO ONE ANOTHER

(71) Applicant: CANON KABUSHIKI KAISHA, Tokyo (JP)

(72) Inventor: Teruaki Ikezawa, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/136,717

(22) Filed: Dec. 20, 2013

(65) Prior Publication Data
US 2014/0184041 A1     Jul. 3, 2014

(30) Foreign Application Priority Data

Dec. 27, 2012 (JP) .................................. 2012-283830

(51) Int. Cl.
*H04N 5/225* (2006.01)
*G03B 17/02* (2006.01)
(52) U.S. Cl.
CPC .............. *H04N 5/2252* (2013.01); *G03B 17/02* (2013.01)
(58) Field of Classification Search
USPC ...................................................... 312/223.1
See application file for complete search history.

(56) References Cited

U.S. PATENT DOCUMENTS

| 6,181,380 | B1 * | 1/2001 | Toyofuku et al. | 348/373 |
| 2008/0180568 | A1 * | 7/2008 | Ohnishi et al. | 348/376 |
| 2009/0135298 | A1 * | 5/2009 | Kaneko et al. | 348/374 |
| 2011/0109790 | A1 * | 5/2011 | Shinohara et al. | 348/373 |
| 2011/0298970 | A1 * | 12/2011 | Shinohara et al. | 348/373 |
| 2013/0194489 | A1 * | 8/2013 | Yamamoto | 348/373 |

FOREIGN PATENT DOCUMENTS

JP        2007-033510 A     2/2007

* cited by examiner

*Primary Examiner* — Sinh Tran
*Assistant Examiner* — Shahbaz Nazrul
(74) *Attorney, Agent, or Firm* — Cowan, Liebowitz & Latman, P.C.

(57) ABSTRACT

An electronic apparatus includes a first exterior member having a first protruding portion, a second exterior member having a second protruding portion, a first fixed member fixed to the first exterior member and having a first abutment portion abutable to the first protruding portion, and a second fixed member fixed to the second exterior member and having a second abutment portion abutable to the second protruding portion. The first fixed member is fixed to the first exterior member, with the first abutment portion abutting against the first protruding portion. The second fixed member is fixed to the second exterior member, with the second abutment portion abutting on the second protruding portion. The first exterior member and the second exterior member are fastened with each other by engaging a first engagement portion on the first fixed member and a second engagement portion on the second fixed member.

12 Claims, 3 Drawing Sheets

ELECTRONIC APPARATUS HAVING MECHANISM TO FASTEN EXTERIOR MEMBERS TO ONE ANOTHER

BACKGROUND OF THE INVENTION

1. Field of the Invention

The present invention relates to an electronic apparatus.

2. Description of the Related Art

Some of the cases of conventional digital still cameras include front exterior members and rear exterior members both of which are composed of a metal material, in order to project an upscale image. One method for fastening such a front exterior member and such a rear exterior member, both of which are composed of a metal material, with each other is to attach each fixed member at the vicinity of the edge portion of a corresponding exterior member and then to cause their hook members to be engaged with each other. Such attachment requires providing each half blanking convex shape portion inside the vicinity of the edge portion of its corresponding exterior member and then swaging each fixed member with its corresponding half blanking convex shape potion. However, in the case where each half blanking convex shape portion is formed at the inside of the vicinity of the edge portion of its corresponding exterior member, a concave shape portion inevitably appears at the outer surface at the vicinity of the edge portion of its corresponding exterior member.

In the case where this coupling method is adopted to couple the front exterior member and the rear exterior member, each exterior member and its corresponding fixed member are to be swaged at two or more points. The swaging at two or more points defines the position of each exterior member relative to its corresponding fixed member and prevents each fixed member from rotating. In the case where each exterior member and its corresponding fixed member are swaged at one point, each fixed member inevitably rotates about a swaging portion. In addition, the fastening strength between the front exterior member and the rear exterior member inevitably decreases.

In Japanese Patent Laid-Open No. 2007-033510, as a technology that avoids degrading the appearance by a convex shape portion on an outer surface of an exterior member, it has been proposed that another exterior member is arranged in a position where a half blanking convex shape portion on the outer surface is covered.

However, in Japanese Patent Laid-Open No. 2007-033510, a size in a height direction or a thickness direction of an electronic apparatus increases since another exterior member needs to arrange in a position where the half blanking convex shape portion of the exterior member is covered. Additionally, there are problems that are an increasing of parts counts and a rise in production cost since another exterior member needs to prepare.

SUMMARY OF THE INVENTION

In view of such problems, it is an object of the present invention to provide an electronic apparatus which can ensure a required fastening strength between each exterior member with each fixed member being appropriately positioned and being prevented from rotating even in the case where each fixed member is rotatably attached to its corresponding exterior member.

An electronic apparatus as an aspect of the present invention includes a first exterior member containing a metal material and having, at its edge portion, a first protruding portion, a second exterior member containing a metal material and having, at its edge portion, a second protruding portion, a first fixed member fixed to the first exterior member and having a first abutment portion abutable to the first protruding portion, and a second fixed member fixed to the second exterior member and having a second abutment portion abutable to the second protruding portion. The first fixed member is fixed to the first exterior member, with the first abutment portion abutting on the first protruding portion. The second fixed member is fixed to the second exterior member, with the second abutment portion abutting on the second protruding portion. The first exterior member and the second exterior member are fastened with each other by engaging a first engagement portion on the first fixed member and a second engagement portion on the second fixed member.

Further features of the present invention will become apparent from the following description of exemplary embodiments (with reference to the attached drawings).

DESCRIPTION OF THE PREFERRED EMBODIMENT

A preferred embodiment of the present invention will be explained below in detail with reference to the attached drawings.

Figure 1A:
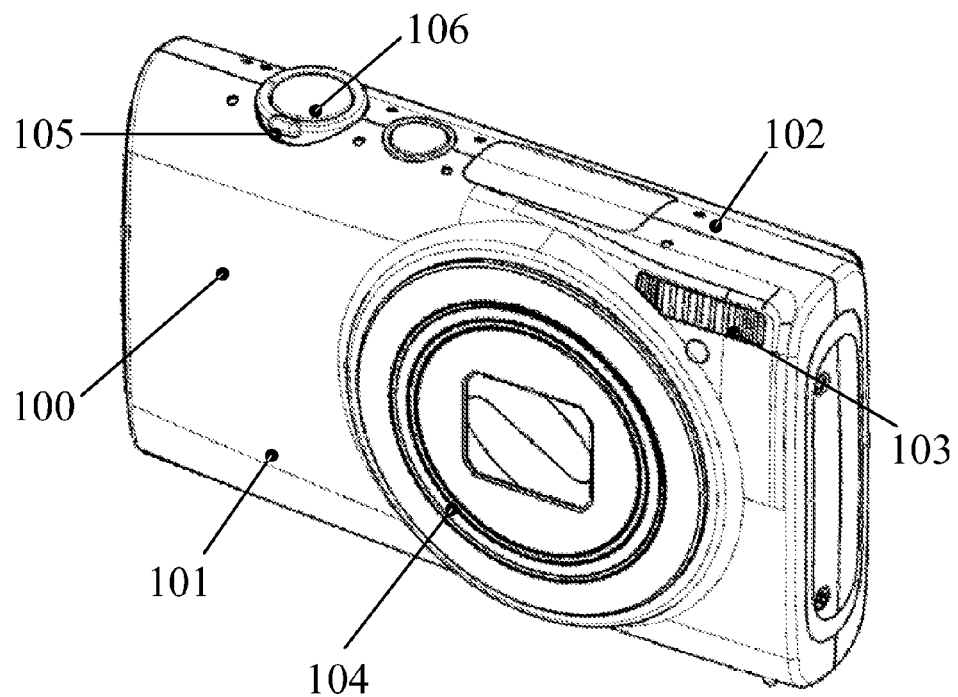
FIGS. 1A and 1B are external perspective views of a digital camera 100 according to an embodiment of the present invention.
Figure 1B:
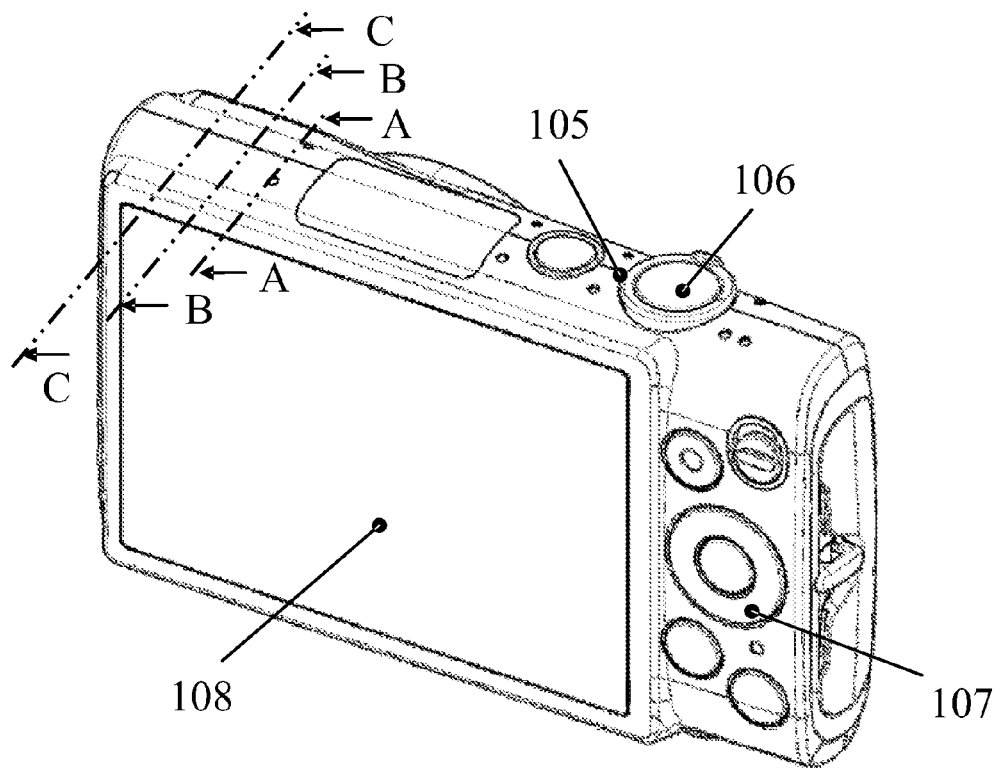

FIGS. 1A and 1B are external perspective views of a digital camera 100, an example of an electronic apparatus according to an embodiment of the present invention. FIG. 1A is a perspective view of the digital camera 100 as seen from the front thereof, and FIG. 1B a perspective view of the digital camera 100 as seen from the back thereof.

The digital camera 100 has two exterior members. One is a front cover 101, a first exterior member composed of a metal material, and the other is a rear cover 102, a second exterior member composed of a metal material. The front cover 101 and the rear cover 102 are fastened with each other.

On the front surface and the upper surface of the digital camera 100, components such as a strobe light emitting window 103 configured to emit a light as required in case of, for example, insufficiency of light intensity at the time of photographing, a lens barrel 104, a zoom lever 105 and a release button 106 are disposed.

Photographing is started by operating the release button 106 after operating the zoom lever 105 to define an appropriate angle of view. These operations cause an object image to be formed on an image pickup element (not shown in the figures) through the lens barrel 104. The formed object image is converted to an image data, subjected to image processing, and then written into a recording medium (not shown in the figures). An antenna 107 composed of a mold material is provided to enable the camera 100 to perform Wi-Fi communication.

On the back surface of the digital camera 100, an operation button 108 is provided to perform an operation displayed on a liquid crystal display 109.

Figure 2:
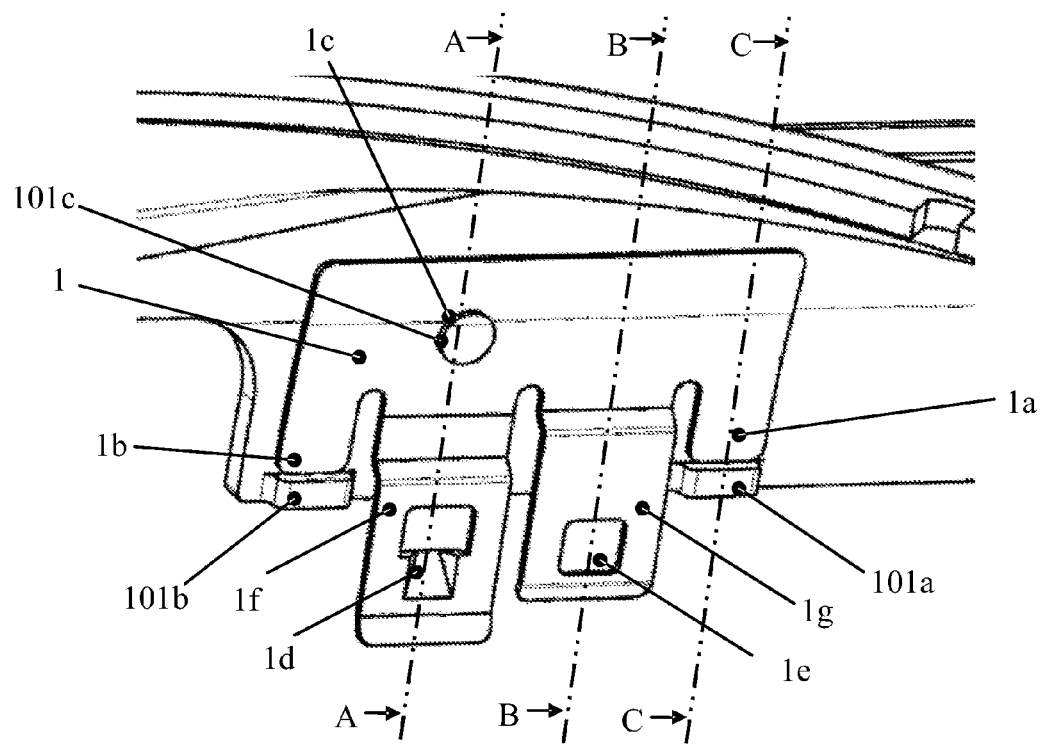
FIG. 2 is a perspective view illustrating a front cover 101 with a hook member 1 being fixed thereto.

FIG. 2 is a perspective view illustrating the front cover 101 of the digital camera 100 with the hook member 1 being fixed to the front cover 101. As illustrated in FIG. 2, at the inside of the edge portion of the front cover 101, nail shape portions (first protruding portions) 101a and 101b, which are subjected to a shaving process performed when the front cover 101 is molded, are formed. In addition, a half blanking convex shape portion (a first convex shape portion) 101c is formed at the inside of the vicinity of the edge portion of the front cover 101.

On a hook member (a first fixed member) 1 having spring characteristics, a hole portion 1c is formed which is designed to be fitted to the half blanking convex shape portion 101c of the front cover 101. The half blanking convex portion 101c is fitted to a hole portion (a first hole portion) 1c and then plastically deformed with taps to cause the hook member 1 to be fixed to the front cover 101. As illustrated in FIG. 2, at both ends of the hook member 1, facing portions (first abutment portions) 1a and 1b are formed so as to extend toward the edge portion of the front cover 101. When the hook member 1 is fixed to the front cover 101, a slight gap is formed between the facing portion 1a of the hook member 1 and the nail shape portion 101a of the front cover 101. Likewise, when the hook member 1 is fixed to the front cover 101, a slight gap is formed between the facing portion 1b of the hook member 1 and the nail shape portion 101b of the front cover 101. On the hook member 1, there is formed an extension portion 1f extending from the hole portion 1c toward the edge portion of the front cover 101. On the portion located at the extension portion 1f and jutting from the edge portion of the front cover 101, a nail portion (a first engagement portion) 1d is formed. On the hook member 1, an extension portion 1g is formed which extends toward the edge portion of the front cover 101 in a direction approximately parallel to the extension portion 1f. At the portion located at the extension portion 1g and jutting from the edge portion of the front cover 101, a hole portion (a locked portion) 1e is formed.

As illustrated in FIG. 2, the half blanking convex shape portion 101c is fitted to the hole portion 1c and then swaged to cause the hook member 1 to be fixed to the front cover 101. This means that the hook member 1 is attached such that it is rotatable about the center of the hole portion 1c. However, this results in the abutment of the facing portion 1a of the hook member 1 on the nail shape portion 101a and the abutment of the facing portion 1b of the hook member 1 on the nail shape portion 101b of the front cover 101, preventing the hook member 1 from rotating.

Figure 3:
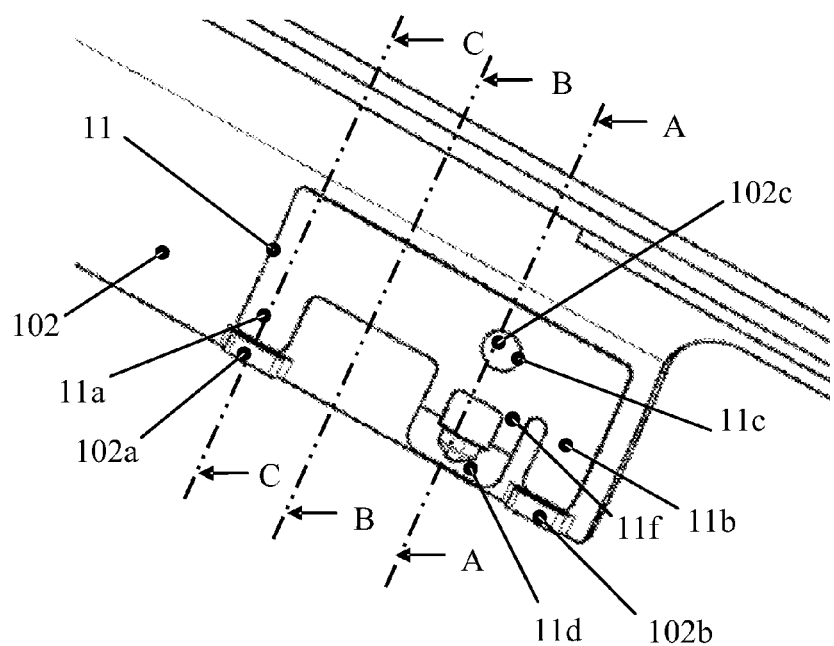
FIG. 3 is a perspective view illustrating a rear cover 102 with a hook member 11 being fixed thereto.

FIG. 3 is a perspective view illustrating the rear cover 102 of the digital camera 100 with the hook member 11 being fixed to the rear cover 102. As illustrated in FIG. 3, at the inside of the edge portion of the rear cover 102, nail shape portions (second protruding portions) 102a and 102b, which are subjected to a shaving process performed when the rear cover 102 is molded, are formed. In addition, a half blanking convex shape portion (a second convex shape portion) 102c is formed at the inside of the vicinity of the edge portion of the rear cover 102.

On the hook member (a second fixed member) 11 having spring characteristics, a hole portion (a second hole portion) 11c is formed which is designed to be fitted to the half blanking convex shape portion 102c of the rear cover 102. The half blanking convex shape portion 102c is fitted to the hole portion 11c and then plastically deformed with taps to cause the hook member 11 to be fixed to the rear cover 102. As illustrated in FIG. 3, at both ends of the hook member 11, facing portions (second abutment portions) 11a and 11b are formed so as to extend toward the edge portion of the rear cover 102. When the hook member 11 is fixed to the rear cover 102, a slight gap is formed between the facing portion 11a of the hook member 11 and the nail shape portion 102a of the rear cover 102. Likewise, when the hook member 11 is fixed to the rear cover 102, a slight gap is formed between the facing portion 11b of the hook member 11 and the nail shape portion 102b of the rear cover 102. On the hook member 11, there is formed an extension portion 11f extending from the hole portion 11c toward the edge portion of the rear cover 102.

As illustrated in FIG. 3, when the hook member 11 is fixed to the rear cover 102, the extension portion 11f does not jut beyond the edge portion of the rear cover 102. On the extension portion 11f, a nail portion (a second engagement portion) 11d engageable with the nail portion 1d is formed.

As illustrated in FIG. 3, the half blanking convex shape portion 102c is fitted to the hole portion 11c and then swaged to cause the hook member 11 to be fixed to the rear cover 102. This means that the hook member 11 is attached such that it is rotatable about the center of the hole portion 11c. However, this results in the abutment of the facing portion 11a of the hook member 11 on the nail shape portion 102a and the abutment of the facing portion 11b of the hook member 11 on the nail shape portion 102b of the rear cover 102, preventing the hook member 11 from rotating.

The combination of the front cover 101 and the rear cover 102 causes the nail portion 1d of the hook member 1 and the nail portion 11d of the hook member 11 to be engaged with each other.

Figure 4A:
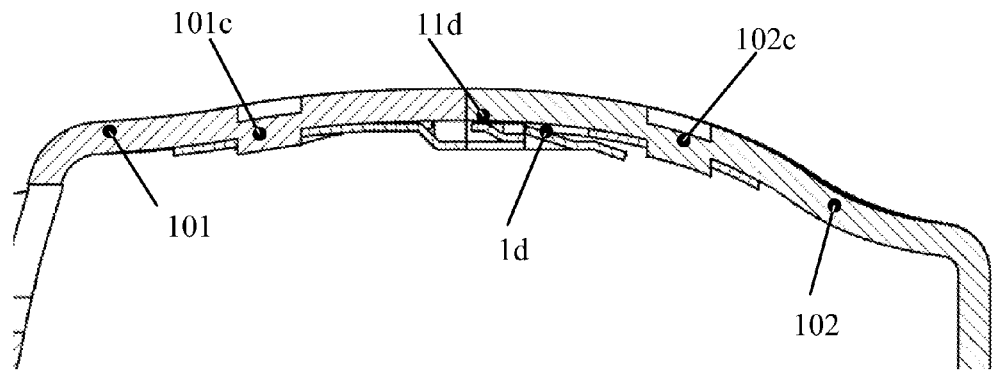
FIGS. 4A to 4C are cross-sectional views of the digital camera 100 with the front cover 101 and the rear cover 102 being combined.
Figure 4B:
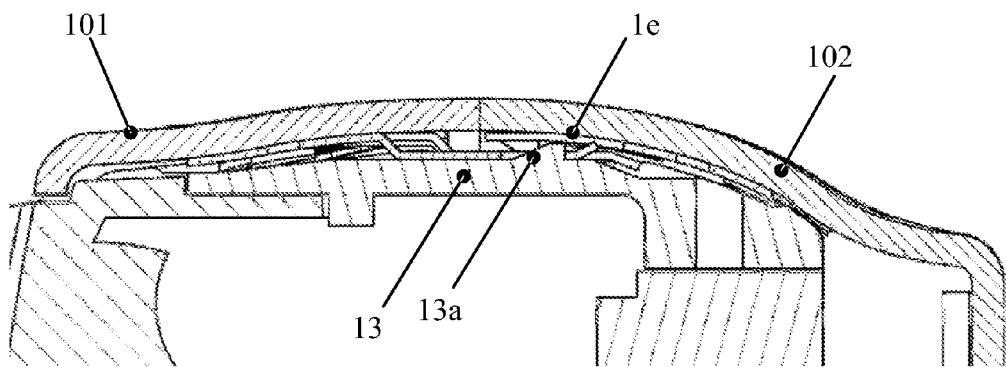
Figure 4C:
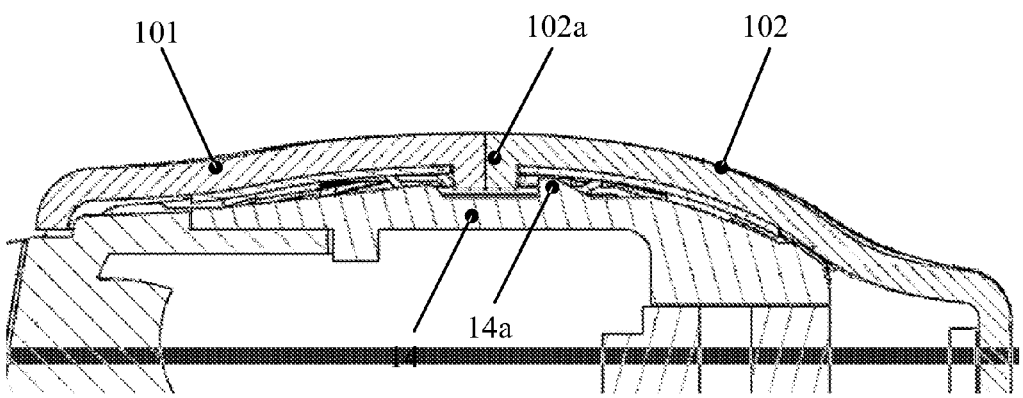

FIGS. 4A to 4C are cross-sectional views of the digital camera 100 with the front cover 101 and the rear cover 102 being combined.

FIG. 4A is a cross-sectional view of each exterior member divided by a cross-section A-A indicated in FIG. 1B. The cross-section A-A of FIG. 1B is the same as the cross-section A-A indicated in FIGS. 2 and 3. The cross-section A-A is a cross-section across the hole portions 1c and 11c, and the nail portions 1d and 11d. Since the hook members 1 and are composed of a material having spring characteristics, the nail portions 1d and 11d bend with each other within an elastic deformation area at the time of the combination thereof and then return to their original shape. This allows the nail portions 1d and 11d to be engaged with each other, which in turn causes the hook members 1 and 11 to be fastened with each other.

FIG. 4B is a cross-sectional view of each exterior member divided by a cross-section B-B indicated in FIG. 1B. The cross-section B-B of FIG. 1B is the same as the cross-section B-B indicated in FIGS. 2 and 3. The cross-section B-B is a cross-section across a hole portion 1e. The hole portion 1e is fitted to a locking portion 13a provided with a first internal constitution member 13 of the digital camera 100.

FIG. 4C is a cross-sectional view of each exterior member divided by a cross-section C-C indicated in FIG. 1B. The cross-section C-C of FIG. 1B is the same as the cross-section C-C indicated in FIGS. 2 and 3. The cross-section B-B is a cross-section across the facing portions 1a and 11a, and the nail shape portions 101a and 102a. A contact portion 14a provided with a second internal constitution member of the digital camera 100 is positioned more back side of the digital camera 100 than the position of a nail shape portion 2a.

If a force widening a gap between the front cover 101 and the rear cover 102 which is caused due to a drop impact is added, the hook member 1 attempts to rotate about the center of the hole portion 1c and the hook member 11 attempts to rotate about the center of the hole portion 11c, respectively.

If the hook member 1 fixed to the front cover 101 rotates clockwise in FIG. 2, a gap between the facing portion 1a and the nail shape portion 101a is gone. This causes the facing portion 1a to abut on the nail shape portion 101a, preventing the hook member 1 from rotating. Likewise, if the hook member 1 fixed to the front cover 101 rotates counterclockwise in FIG. 2, a gap between the facing portion 1b and the nail shape portion 101b is gone. This causes the facing portion 1b to abut on the nail shape portion 101b, preventing the hook member 1 from rotating.

After the facing portion 1a abuts on the nail shape portion 101a, the force widening the gap between the front cover 101 and the rear cover 102 is received by a portion at which the half blanking convex shape portion 101c and the hole portion 1c is swaged with each other and by a portion at which the facing portion 1a abuts the nail shape portion 101a. After the facing portion 1b abuts on the nail shape portion 101b, the force widening the gap between the front cover 101 and the rear cover 102 is received by the portion at which the half blanking convex shape portion 101c and the hole portion 1c are swaged with each other and by a portion at which the facing portion 1b abuts the nail shape portion 101b. This enables the hook member 1 to receive the force widening the gap between the front cover 101 and the rear cover 102 with the force being distributed over such two points, thereby making it possible to ensure a sufficient fastening strength.

On the other hand, if the hook member 11 fixed to the rear cover 102 rotates clockwise in FIG. 3, a gap between the facing portion 11b and the nail shape portion 102b is gone. This causes the facing portion 11b to abut on the nail shape portion 102b, preventing the hook member 11 from rotating. Likewise, if the hook member 11 fixed to the rear cover 102 rotates counterclockwise in FIG. 3, a gap between the facing portion 11a and the nail shape portion 102a is gone. This causes the facing portion 11a to abut on the nail shape portion 102a, preventing the hook member 11 from rotating.

After the facing portion 11a abuts on the nail shape portion 102a, the force widening the gap between the front cover 101 and the rear cover 102 is received by a portion at which the half blanking convex shape portion 102c and the hole portion 11c are swaged with each other and by a portion at which the facing portion 1a abuts the nail shape portion 101a. After the facing portion 11b abuts on the nail shape portion 102b, the force widening the gap between the front cover 101 and the rear cover 102 is received by the portion at which the half blanking convex shape portion 102c and the hole portion 11c are swaged with each other and by a portion at which the facing portion 11b abuts the nail shape portion 102b. This enables the hook member 11 to receive the force widening the gap between the front cover 101 and the rear cover 102 with the force being distributed over such two points, thereby making it possible to ensure a sufficient fastening strength.

The hole potion 1e provided with the hook member 1 is fastened with the locking portion 13a provided with the internal constitution member 13 of the digital camera 100. This permits not only the fastening of the front cover 101 and the rear cover 102, but also the fastening with the internal constitution member 13, making the digital camera 100 have a stronger structure against drop impact.

If the digital camera 100 suffers an impact such as a drop impact, the nail portions 1d and 11d become disengaged, which may cause a gap between the front cover 101 and the rear cover 102 to be widened. Even in such case, the contact of the nail shape portions 102a and 102b with the contact portion 14a provided with the internal constitution member 14 of the digital camera 100 prevents the gap between the front cover 101 and the rear cover 102 from becoming larger.

In this embodiment, the swaging is done by forming a convex shape portion inside each of the front cover 101 and the rear cover 102 and then plastically deforming each convex shape portion. This makes it possible to decrease the number of concave shape portions appearing at the front cover 101 and the rear cover 102. Also in the case where the hook members are fixed by welding to the front cover composed of a metal material, welding traces inevitably appear on the outer surface of the front cover. The adoption of the structure according to this embodiment makes it possible to decrease the number of such welding traces appearing on the outer surface of the front cover.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-283830, filed on Dec. 27, 2012, which is hereby incorporated by reference herein in its entirety.

What is claimed is:

1. An electronic apparatus comprising:
a first exterior member which is made by a metal material;
a second exterior member which is made by a metal material;
a first engagement member which has a first engagement portion; and
a second engagement member which has a second engagement portion,
wherein the first exterior member has a first convex shape portion and a first protruding portion,
wherein the first engagement member has a first abutment portion,
wherein in a case where the first engagement member is fixed to the first exterior member by fitting a first hole portion at the first engagement member to the first convex shape portion, the first abutment portion of the first engagement member is abuttable against the first protruding portion of the first exterior member,
wherein the second exterior member has a second convex shape portion and a second protruding portion,
wherein the second engagement member has a second abutment portion,
wherein in a case where the second engagement member is fixed to the second exterior member by fitting a second hole portion at the second engagement member to the second convex shape portion, the second abutment portion of the second engagement member is abuttable against the second protruding portion of the second exterior member,
wherein the first exterior member and the second exterior member are fastened with each other by engaging the first engagement portion on the first engagement member fixed to the first exterior member and the second engagement portion on the second engagement member.

2. The electronic apparatus according to claim 1,
wherein the first engagement member is fixed to the first exterior member by fitting a first hole portion at the first engagement member to the first convex shape portion and then plastically deforming the first convex shape portion, and
wherein the second engagement member is fixed to the second exterior member by fitting a second hole portion at the second engagement member to the second convex shape portion and then plastically deforming the second convex shape portion.

3. The electronic apparatus according to claim 1, wherein the first protruding portion and the second protruding portion are formed by shaving process.

4. The electronic apparatus according to claim 1, wherein the first engagement member comprises a locked portion to be fitted with a locking portion on a first internal constitution member of the electronic apparatus.

5. The electronic apparatus according to claim 1, wherein a second internal constitution member of the electronic apparatus comprises a contact portion configured to come into contact with the second protruding portion if the first engagement portion and the second engagement portion become disengaged.

6. The electronic apparatus according to claim 1,
wherein the first engagement member has a plurality of the first abutment portions,
wherein the first hole portion is provided between the first abutment portions,
wherein the second engagement member has a plurality of the second abutment portions, and
wherein the second hole portion is provided between the second abutment portions.

7. An electronic apparatus comprising:
a first exterior member which is made by a metal material;
a first engagement member which has a first engagement portion; and
a second exterior member which has a second engagement portion;
wherein the first exterior member has a first convex shape portion and a first protruding portion,
wherein the first engagement member has a first abutment portion,
wherein in a case where the first engagement member is fixed to the first exterior member by fitting a first hole portion at the first engagement member to the first convex shape portion, the first abutment portion of the first engagement member is abuttable against the first protruding portion of the first exterior member, and
wherein the first exterior member and the second exterior member are fastened with each other by engaging the first engagement portion on the first engagement member fixed to the first exterior member and the second engagement portion on the second exterior member.

8. The electronic apparatus according to claim 7,
wherein the first engagement member is fixed to the first exterior member by fitting a first hole portion at the first engagement member to the first convex shape portion and then plastically deforming the first convex shape portion.

9. The electronic apparatus according to claim 7, wherein the first protruding portion and the second protruding portion are formed by shaving process.

10. The electronic apparatus according to claim 7, wherein the first engagement member comprises a locked portion to be fitted with a locking portion on a first internal constitution member of the electronic apparatus.

11. The electronic apparatus according to claim 7, wherein a second internal constitution member of the electronic apparatus comprises a contact portion configured to come into contact with the second protruding portion if the first engagement portion and the second engagement portion become disengaged.

12. The electronic apparatus according to claim 7,
wherein the first engagement member has a plurality of the first abutment portions,
wherein the first hole portion is provided between the first abutment portions, and
wherein the second engagement member has a plurality of the second abutment portions.

\* \* \* \* \*